(12) United States Patent  (10) Patent No.: US 7,640,414 B2
Cox et al.  (45) Date of Patent:  Dec. 29, 2009

(54) METHOD AND APPARATUS FOR FORWARDING STORE DATA TO LOADS IN A PIPELINED PROCESSOR

(75) Inventors: Jason Alan Cox, Raleigh, NC (US); Kevin Chih Kang Lin, Raleigh, NC (US); Eric Francis Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/560,443

(22) Filed: Nov. 16, 2006

(65) Prior Publication Data

US 2008/0120472 A1 May 22, 2008

(51) Int. Cl.
*G06F 12/00* (2006.01)
(52) U.S. Cl. .................. 711/168; 711/123; 711/126; 711/154; 711/169; 712/208; 712/225
(58) Field of Classification Search ................. 711/123, 711/126, 154, 168–169; 712/208, 225
See application file for complete search history.

(56) References Cited

U.S. PATENT DOCUMENTS 5,606,670 A 2/1997 Abramson et al.
6,141,747 A * 10/2000 Witt ........................... 712/225
6,393,536 B1 5/2002 Hughes et al.

* cited by examiner

*Primary Examiner*—Jasmine Song
(74) *Attorney, Agent, or Firm*—Yee & Associates, P.C.; Mark E. McBurney

(57) ABSTRACT

Methods, systems, and computer program products for forwarding store data to loads in a pipelined processor are provided. In one implementation, a processor is provided that includes a decoder operable to decode an instruction, and a plurality of execution units operable to respectively execute a decoded instruction from the decoder. The plurality of execution units include a load/store execution unit operable to execute decoded load instructions and decoded store instructions and generate corresponding load memory operations and store memory operations. The store queue is operable to buffer one or more store memory operations prior to the one or more memory operations being completed, and the store queue is operable to forward store data of the one or more store memory operations buffered in the store queue to a load memory operation on a byte-by-byte basis.

19 Claims, 10 Drawing Sheets

| V | ADDR | BE | FWD | DATA |

FIG. 7A

| V | ADDR |
|---|---|
| 1 | 0x0000 0000 0000 |

| BYTE ENABLES |
|---|
| 0 0 1 1 0 0 0 0 |
| FWD (forwardable) |
| 0 0 1 1 0 0 0 0 |
| DATA |
| - - 22 33 - - - - |

The full addr is 0x0000 0000 0002, but DW addr is 0x0000 0000 0000. The "2" is an offset into the DW and so is represented thru byte_enables rather than as part of the DW addr field

FIG. 7B

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11A*

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 1 | 0x0002 | 0 | 0 | 1 | 1 | 1 | 1 | 0 | 0 | 0 | 0 | 1 | 1 | 1 | 1 | 0 | 0 | 00 00 AA BB CC DD 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11B*

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 1 | 0x0002 | 0 | 0 | 1 | 1 | 1 | 1 | 0 | 0 | 0 | 0 | 1 | 1 | 1 | 1 | 0 | 0 | 00 00 AA BB CC DD 00 00 |
| 1 | 0x0001 | 0 | 1 | 1 | 0 | 0 | 0 | 0 | 0 | 0 | 1 | 1 | 0 | 0 | 0 | 0 | 0 | 00 77 88 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11C*

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 1 | 0x0002 | 0 | 0 | 1 | 1 | 1 | 1 | 0 | 0 | 0 | 0 | 0 | 0 | 1 | 1 | 0 | 0 | 00 00 AA BB CC DD 00 00 |
| 1 | 0x0001 | 0 | 1 | 1 | 0 | 0 | 0 | 0 | 0 | 0 | 0 | 0 | 0 | 0 | 0 | 0 | 0 | 00 77 88 00 00 00 00 00 |
| 1 | 0x0000 | 1 | 1 | 1 | 1 | 0 | 0 | 0 | 0 | 1 | 1 | 1 | 1 | 0 | 0 | 0 | 0 | EE FF 11 22 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11D*

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 1 | (0x0002) | 0 | 0 | 1 | 1 | 1 | 1 | 0 | 0 | 0 | 0 | 0 | 0 | (1 | 1) | 0 | 0 | 00 00 AA BB (CC DD) 00 00 |
| 1 | 0x0001 | 0 | 1 | 1 | 0 | 0 | 0 | 0 | 0 | 0 | 0 | 0 | 0 | 0 | 0 | 0 | 0 | 00 77 88 00 00 00 00 00 |
| 1 | 0x0000 | 1 | 1 | 1 | 1 | 0 | 0 | 0 | 0 | 1 | 1 | 1 | 1 | 0 | 0 | 0 | 0 | EE FF 11 22 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11E*

| VLD | ADDR | BYTE ENABLE (BE) | | | | | | | | FORWARDABLE (FWD) | | | | | | | | DATA |
|---|---|---|---|---|---|---|---|---|---|---|---|---|---|---|---|---|---|---|
| 1 | (0x0002) | 0 | 0 | 1 | 1 | 1 | 1 | 0 | 0 | 0 | 0 | 0 | 0 | (1 | 1) | 0 | 0 | 00 00 AA BB (CC DD) 00 00 |
| 1 | (0x0001) | 0 | 1 | 1 | 0 | 0 | 0 | 0 | 0 | 0 | 0 | 0 | 0 | 0 | 0 | 0 | 0 | 00 77 88 00 00 00 00 00 |
| 1 | (0x0000) | 1 | 1 | 1 | 1 | 0 | 0 | 0 | 0 | 1 | 1 | (1 | 1) | 0 | 0 | 0 | 0 | EE FF (11 22) 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |
| 0 | 0x0000 | 0 | 0 | 0 | 0 | 0 | 0 | 0 | 0 | 0 | 0 | 0 | 0 | 0 | 0 | 0 | 0 | 00 00 00 00 00 00 00 00 |

*FIG. 11F*

METHOD AND APPARATUS FOR FORWARDING STORE DATA TO LOADS IN A PIPELINED PROCESSOR

FIELD OF THE INVENTION

The present invention relates generally to processing systems and circuits, and more particularly to techniques for forwarding store data to loads in a pipelined processor.

BACKGROUND OF THE INVENTION

Pipelined processors typically include a store queue (or store buffer) for buffering store memory operations (referred to herein also as "stores") prior to the store memory operations being completed (e.g., committed to a data cache or memory). The buffering of store memory operations in a store queue permits a processor to execute additional instructions without having to wait for actual completion of prior stores. Accordingly, when a load memory operation (referred to herein also as a "load") executes, a determination is made of whether a data hazard exists between the load memory operation and any store memory operations buffered in the store queue. A data hazard between a load and store can exist, for example, when a load requires data from the same line address and bytes (of a cache) to which a buffered store has yet to write.

One conventional technique for handling a data hazard is described in U.S. Pat. No. 6,393,536, entitled "Load/Store Unit Employing Last-In-Buffer Indication For Rapid Load-Hit-Store". The technique includes maintaining a "forwarding" buffer that is separate from the store queue, which forwarding buffer keeps track of prior loads and stores. Each store in the forwarding buffer includes a last-in-buffer (LIB) indicator that indicates whether the store is the youngest store (i.e., the store nearest a given load in program order and, therefore, the store which contains the data that the load should receive) and only allows the data corresponding to the youngest store to be forwarded to the load. Because the data in the forwarding buffer remains until the data is removed, the forwarding buffer behaves as a small cache, and as such, additional controls are required to manage the data contained within the forwarding buffer. For example, when data is cast from the main data cache, corresponding data must also be invalidated from the forwarding buffer. In addition, extra area is required in a processor architecture to support a store queue along with a separate forwarding buffer.

BRIEF SUMMARY OF THE INVENTION

In general, in one aspect, this specification describes a processor including a decoder operable to decode an instruction, and a plurality of execution units operable to respectively execute a decoded instruction from the decoder. The plurality of execution units include a load/store execution unit operable to execute decoded load instructions and decoded store instructions and generate corresponding load memory operations and store memory operations. The processor further includes a store queue operable to buffer one or more store memory operations prior to the one or more memory operations being completed. The store queue is operable to forward store data of the one or more store memory operations buffered in the store queue to a load memory operation on a byte-by-byte basis.

Particular implementations can include one or more of the following features. The store data provided to the load memory operation can include a first byte from a first store memory operation buffered in the store queue and can include a second byte from a second store memory operation buffered in the store queue. For each store memory operation buffered in the store queue, the store queue can maintain a forwardable (FWD) bit for each byte to be written by the store memory operation, in which the forwardable (FWD) bit indicates whether the corresponding byte can be forwarded to a load. The store queue can be in communication with a data cache, and the processor can include one or more data selection multiplexers operable to be controlled to provide data stored in the data cache along with store data of one or more store memory operations buffered in the store queue responsive to a load memory operation. The data cache can be an L1 (level 1) data cache. The store queue can be memory aligned, and can include a rotator operable to place store data of a store memory operation into pre-determined byte lanes in the store queue. The processor can further include a data formatter operable to place data output from the one or more data selection multiplexers into pre-determined byte lanes for register alignment. For each store memory operation buffered in the store queue, the store queue can maintain a byte enable (BE) bit for each byte to be written by the store memory operation, in which the byte enable (BE) bit indicates whether the corresponding byte is to be written to the data cache. The processor can be an in-order execution processor or an out-of-order execution processor.

In general, in another aspect, this specification describes a method of operation for a store queue in a processor. The method includes receiving a first store memory operation at the store queue, and setting a forwardable (FWD) bit of each byte to be written by the first store memory operation. The forwardable (FWD) bit indicates whether the corresponding byte can be forwarded to a load. The method further includes resetting a forwardable (FWD) bit corresponding to each byte in a second store memory operation buffered in the store queue responsive to the byte in the second store overlapping a byte to be written by the first store memory operation.

Particular implementations can include one or more of the following features. The method can further include forwarding store data of the first store memory operation or store data of the second store memory operation to a load memory operation on a byte-by-byte basis. The method can further include using each set forwardable (FWD) bit in the store queue as a multiplexer select for selecting each byte of the store data forwarded from the store queue. Forwarding store data of the first store memory operation or store data of the second store memory operation to a load memory operation can include forwarding a first byte from the first store memory operation and forwarding a second byte from the second store memory operation to the load memory operation. Forwarding store data of the first store memory operation or store data of the second store memory operation to a load memory operation can include comparing an address associated with the load memory operation to an address associated with each of the first store memory operation and the second store memory operation, and forwarding each byte of the first store memory operation or the second store memory operation having a set forwardable (FWD) bit responsive to the address associated with the load memory operation matching the address associated with each of the first store memory operation or the second store memory operation. The method can further include setting a byte enable (BE) bit of each byte to be written by the first store memory operation, in which the byte enable (BE) indicates whether the corresponding byte is to be written to a data cache.

In general, in another aspect, this specification describes a computer program product, tangibly stored on a computer readable medium, for operating for a store queue. The computer program product comprises instructions to cause a programmable processor to receive a first store memory operation at the store queue, and set a forwardable (FWD) bit of each byte to be written by the first store memory operation. The forwardable (FWD) bit indicates whether the corresponding byte can be forwarded to a load. The computer program product comprises instructions to reset a forwardable (FWD) bit corresponding to each byte in a second store memory operation buffered in the store queue responsive to the byte in the second store overlapping a byte to be written by the first store memory operation.

Implementations can provide one or more of the following advantages. In one aspect, the techniques for forwarding store data to loads does not require complex prioritization logic to determine which of multiple stores in a store queue is the youngest store corresponding to a given load. In one implementation, each byte of a given store is marked with a forwardable (FWD) bit that controls whether the given store is eligible to forward the marked byte to a load. Thus, in a case in which stores do not fully overlap one another (in terms of bytes) or of a load not fully overlapping a youngest store, the store-to-load forwarding data can be assembled from multiple entries of the store queue unlike in conventional techniques. Moreover, store-to-load forwarding data can comprise bytes from a store queue (e.g., from one or more entries) along with bytes from a data cache (e.g., an L1 data cache). Additionally, because there can be only one matching, forwardable store entry per byte that contains the data required by a load, comparator match signals can directly form multiplexer selects without having to be prioritized by age—thereby allowing forward mixing to be implemented with less delay.

The details of one or more implementations are set forth in the accompanying drawings and the description below. Other features and advantages will be apparent from the description and drawings.

BRIEF DESCRIPTION OF THE DRAWINGS

FIGS. 7A-7B illustrate fields of a store queue entry in accordance with one implementation.

FIGS. 11A-11F illustrate an example operation of a store queue in accordance with one implementation.

Like reference symbols in the various drawings indicate like elements.

DETAILED DESCRIPTION OF THE INVENTION

The present invention relates generally to processing systems and circuits, and more particularly to techniques for forwarding store data to loads in a pipelined processor. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
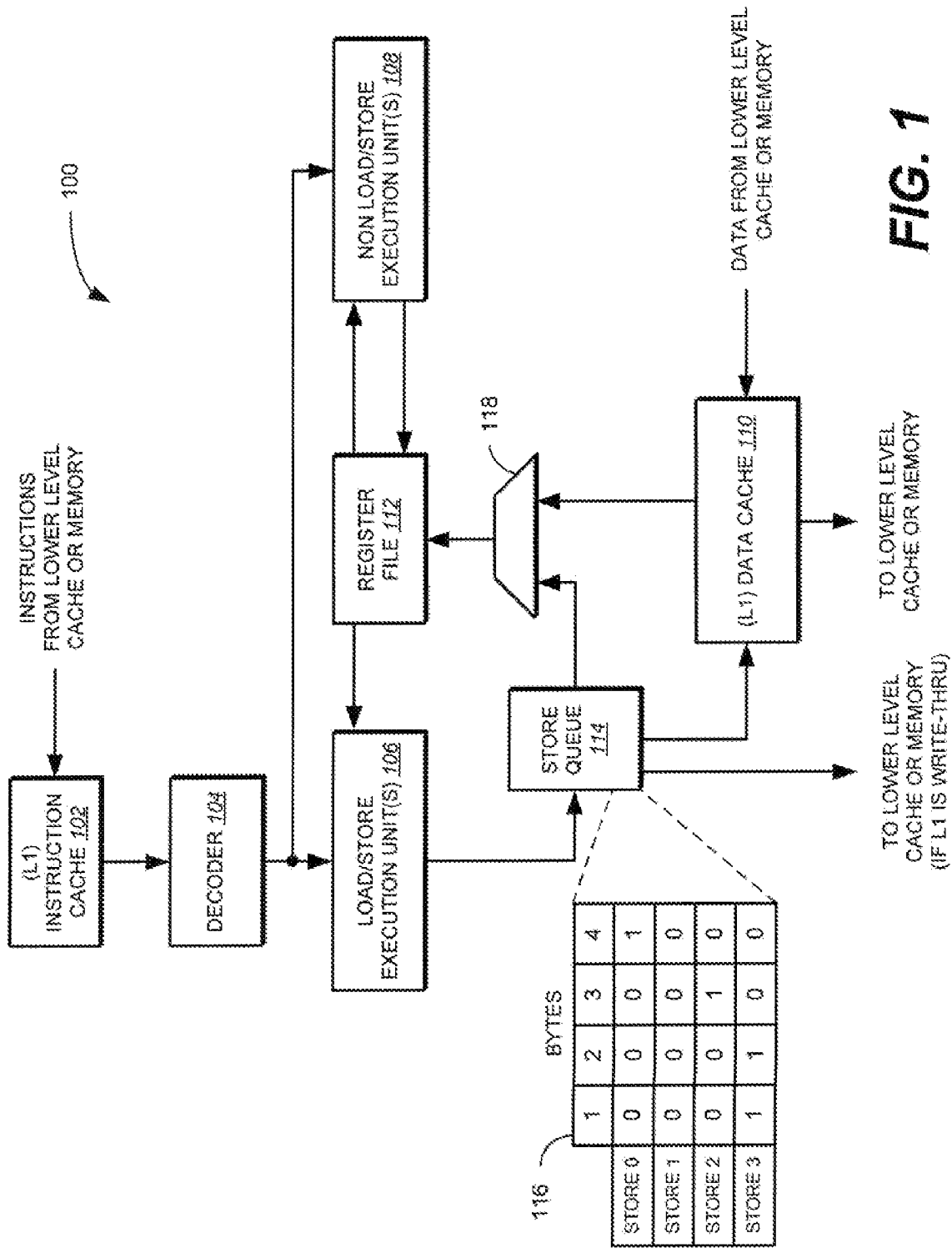
FIG. 1 is a block diagram of a processor in accordance with one implementation.

FIG. 1 illustrates a processor 100 in accordance with one implementation. The processor 100 includes an instruction cache 102, a decoder 104, load/store execution unit(s) 106, non-load store execution unit(s) 108, a data cache 110, a register file 112 (also referred to in the figures as a General Purpose Register file (GPR)), and a store queue 114. The instruction cache 102 is a cache memory provided to hold instructions. In one implementation, the instruction cache 102 is an L1 (level 1) instruction cache that is operable to receive instructions from a lower level cache or a main memory. The decoder 104 receives instructions from the instruction cache 102 and generates decoded instructions to be executed by an execution unit. For example, the decoded instructions can comprise a load instruction or a store instruction to be executed by the load/store execution unit(s) 106, or can comprise a shift instruction, an add instruction, a branch instruction, floating point instruction, or the like, to be executed by the non-load/store execution unit(s) 108. In general, the load/store execution unit(s) 106 provides an interface between the register file 112 and the data cache 110. In particular, the load/store execution unit(s) 106 loads data (e.g., operands) that are required by the non-load/store execution unit(s) 108 (for execution of a decoded instruction) from the data cache 110 to the register file 112. The load/store execution unit(s) 106 also stores data generated from an executed instruction from the register file 112 to the data cache 110. In one implementation, the data cache 110 is an L1 data cache that temporarily stores data being transferred between the register file 112 and a lower level cache or a main memory.

The processor 100 further includes a store queue 114 that (in one implementation) buffers store memory operations prior to the store memory operations being committed to the data cache 110. For each byte that is being written by a given store in the store queue 114, the store queue 114 maintains a corresponding forwardable (FWD) bit that indicates whether that byte can be forwarded to a load. Thus, for example, referring to the example forwardable bit matrix 116 shown in FIG. 1, if a load requires a word load (4 bytes) from an address (e.g., a real address) that has yet to be written to by stores 0-3, then store 3 will provide data from bytes 1 and 2, store 2 will provide data from byte 3, and store 0 will provide data from byte 4. Unlike conventional store-to-load forwarding techniques, the store queue 114 can provide data to a load on a byte-by-byte basis and, additionally, the data provided to a load can be derived from multiple store entries within the store queue 114, as described in greater detail below. As shown in FIG. 1, the processor 100 further includes a multiplexer (or a plurality of multiplexers) 118 that can be controlled to provide data to the register file 112 from the store queue 114 and/or the data cache 110. Thus, in one implementation, all target bytes (store data bytes to be forwarded) for a load need not come from the store queue 114—i.e., some of the target bytes can be obtained from the store queue 114 while other target bytes can be obtained from the data cache 110.

Figure 2:
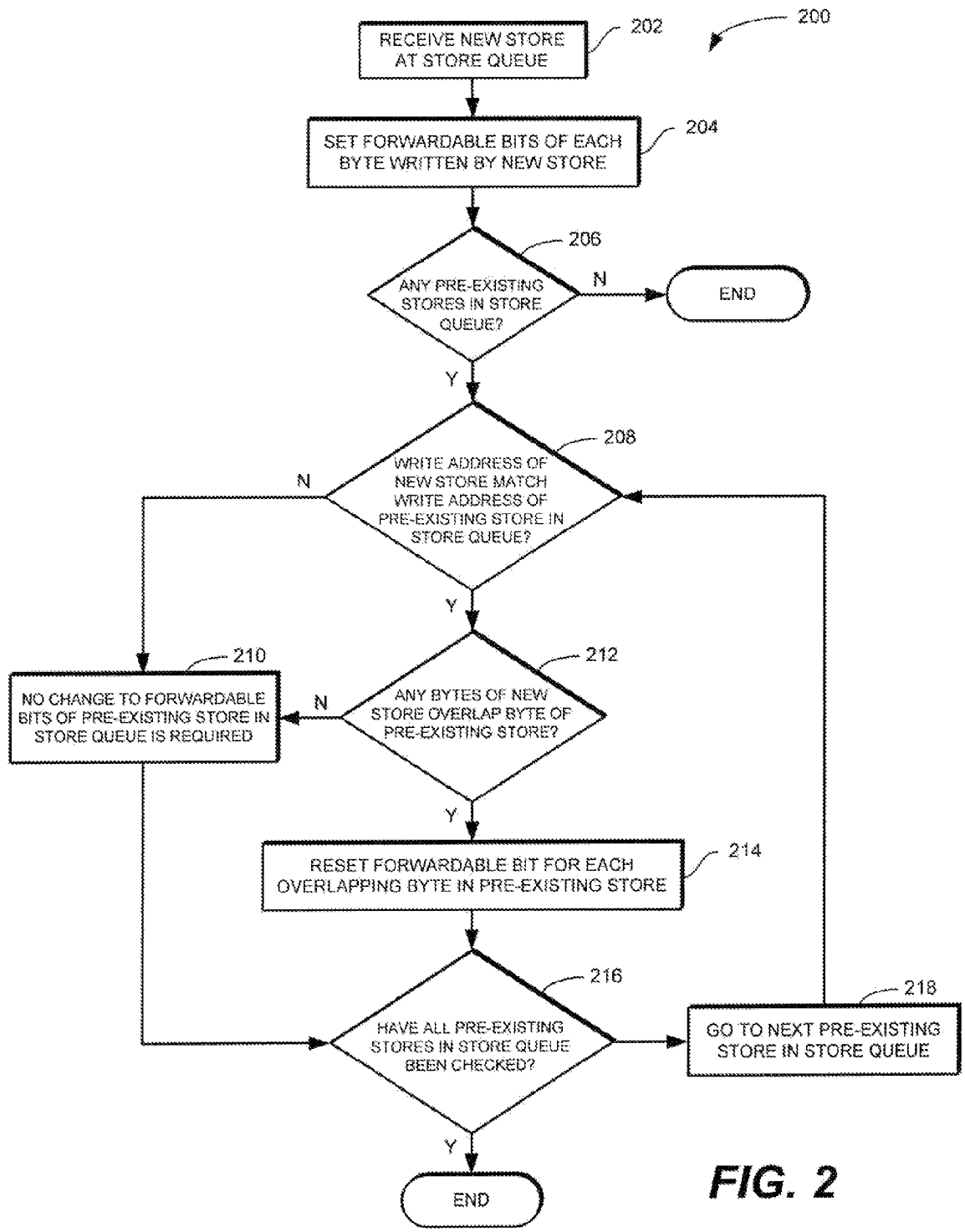
FIG. 2 illustrates a flow diagram of a process for maintaining a forwardable bit for each byte of a store in accordance with one implementation.

FIG. 2 illustrates a process 200 for maintaining a forwardable (FWD) bit for each byte of a store in accordance with one implementation. A new store is received at a store queue (e.g., store queue 114) (step 202). A forwardable (FWD) bit corresponding to each byte to be written by the new store is set (step 204). As discussed above (and described in greater detail below), a forwardable (FWD) bit indicates whether the corresponding byte can be forwarded to a load. A determination is made whether there are any pre-existing stores in the store queue (step 206). If there are no pre-existing stores in the store queue then the process 200 ends, and all the bytes of the new store can, therefore, be forwarded to a load (as the forwardable (FWD) bit corresponding to each byte of the new store is set). If there are pre-existing stores in the store queue, then (for a first pre-existing store in the store queue) a determination is made whether the write address (e.g., a store real address) of the new store matches a write address of the pre-existing store (step 208). If the write address of the new store does not match the write address of the pre-existing store, then no changes are made to the forwardable (FWD) bits that are set with respect to the pre-existing store (step 210).

If, however, the write address of the new store does match the write address of the pre-existing store, a determination is made whether any bytes (to be written) by the new store overlaps any bytes (to be written) by the pre-existing store (step 212). If none of the bytes of the new store overlap any bytes of the pre-existing store, then the process 200 proceeds to step 210, in which no changes are made to the forwardable (FWD) bits that are set with respect to the pre-existing store. If one or more bytes of the new store do overlap one or more corresponding bytes of the pre-existing store, then the forwardable (FWD) bit associated with each overlapping byte of the pre-existing store is reset (or cleared) (step 214). Accordingly, the pre-existing store no longer contains the youngest byte (for each overlapping byte) which will be forwarded to a load, as there is at most one forwardable bit set for each byte of data among the pre-existing stores in the store queue. Thus, in one implementation, each set forwardable (FWD) bit in the store queue is utilized as a multiplexer select for selecting each byte of the store data to be forwarded from the store queue. In this implementation, no ordering or prioritization of store data in a store queue is needed at the time of determining whether a data hazard exists (or at the time of a load match), as the prioritization of store data occurs at the time a store is buffered in the store queue. A determination is made whether all pre-existing stores in the store queue have been checked (step 216). If all of the pre-existing stores have been checked, then the process 200 ends, otherwise, the process 200 proceeds to the next store in the store queue (step 218), and returns to step 208 discussed above.

Figure 3:
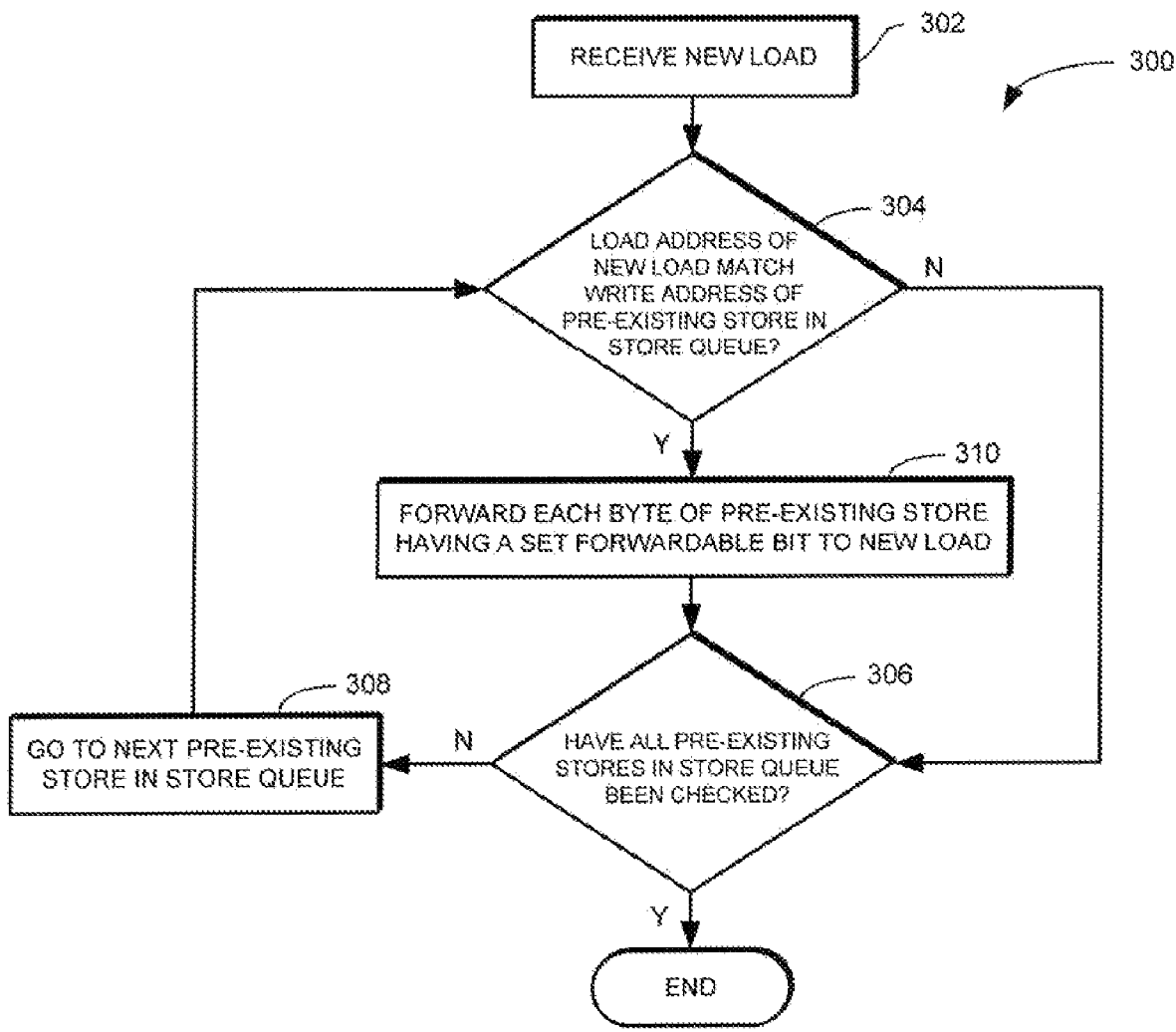
FIG. 3 illustrates a flow diagram of a process for forwarding store data to a load using forwardable bits in accordance with one implementation.

FIG. 3 illustrates a process 300 for forwarding store data to a load using forwardable bits in accordance with one implementation. A new load is received (e.g., by load/store execution unit 106) (step 302). A determination is made whether the load address (e.g., a load real address) matches a write address (e.g., a store real address) of a first pre-existing store in the store queue (step 304). If the load address of the new load does not match the write address of the pre-existing store, a determination is made whether all of the pre-existing stores in the store queue have been checked (step 306). If all of the pre-existing stores have been checked, the process 300 ends, otherwise the process 300 goes to the next pre-existing store in the store queue (step 308) and returns to step 304. In step 304, if the load address of the new load matches the write address of the pre-existing store, then each byte of the pre-existing store that has a set forwardable (FWD) bit (and that is desired by the new load) is forwarded to the new load (step 310). The process 300 then proceeds to step 306 as discussed above.

Figure 4:
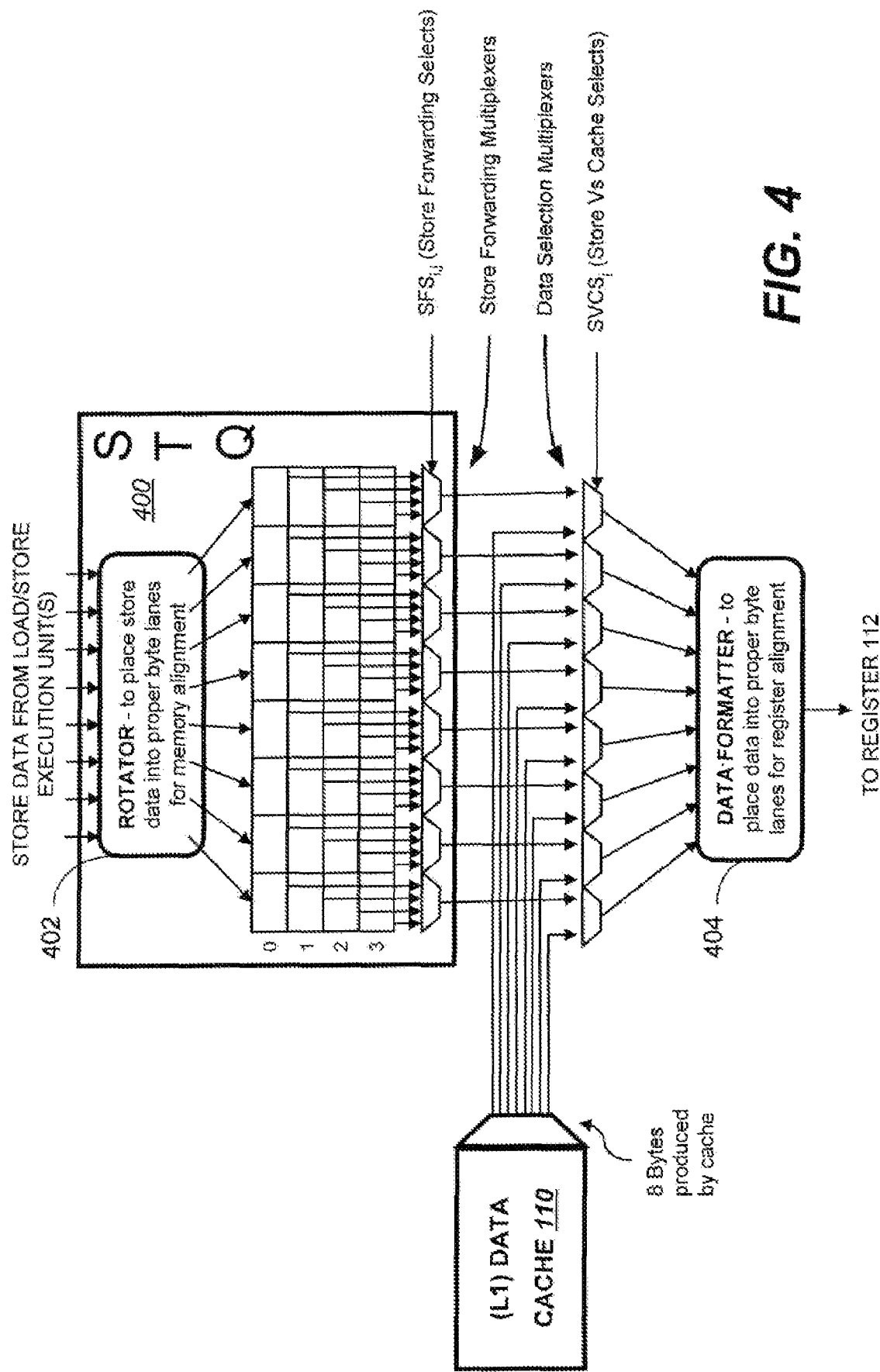
FIG. 4 is a schematic diagram of a portion of the dataflow of a store queue (STQ) in accordance with one implementation.
Figure 5A:
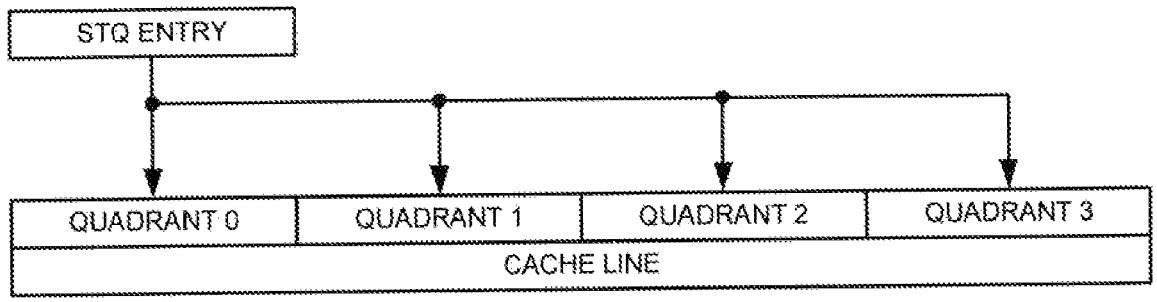
FIGS. 5A-5B illustrate replication of dataflow between a store queue entry and a data cache line in accordance with one implementation.
Figure 5B:
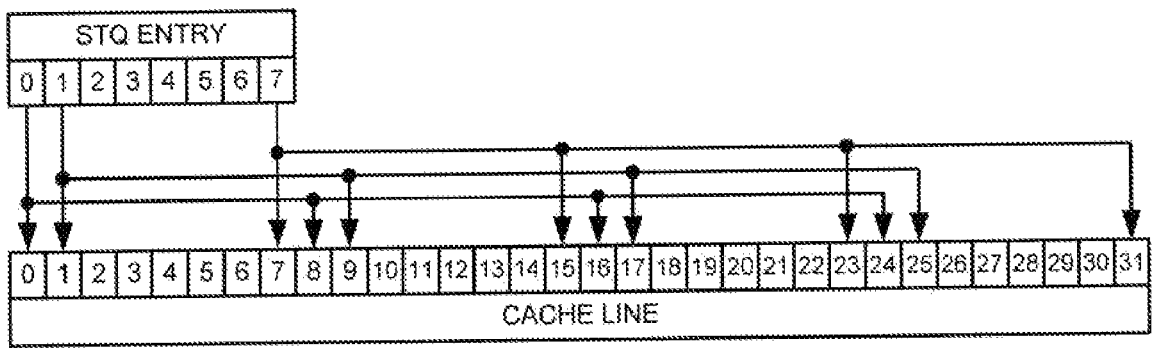
Figure 6:
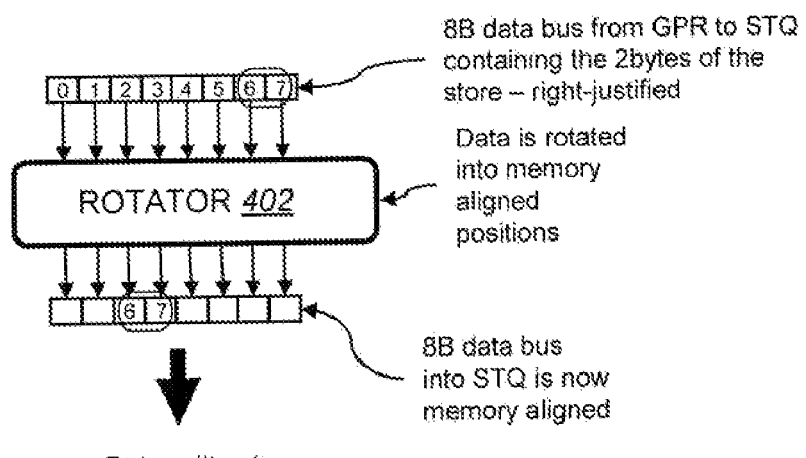
FIG. 6 illustrates a block diagram of a rotator in the store queue of FIG. 4 in accordance with one implementation.

FIG. 4 illustrates a portion of the dataflow of a store queue 400 in accordance with one implementation. In the implementation shown in FIG. 4, the store queue 400 receives data from a load/store execution unit that is 8 bytes wide, and the data cache 110 line width is 32 bytes. In addition, the store queue 400 includes 4 entries 0-3, with each entry being 8 bytes wide. In one implementation, each store queue entry 0-3 is memory aligned, rather than register aligned. That is, in one implementation, each store queue entry 0-3 is memory aligned such that each byte in the store queue corresponds to a particular memory location in the data cache—e.g., store queue byte 0 maps to byte 0, 8, 16, or 24 in the data cache line, store queue byte 1 maps to byte 1, 9, 17, or 25 in the data cache line, and so on, as shown in FIGS. 5A-5B. In the example of FIGS. 5A-5B, each store queue entry is $\frac{1}{4}^{th}$ the data cache line width. In one implementation, when a store is written to the data cache, only those bytes that need to be written are enabled, and although each byte is physically connected to 4 input bytes on the cache, no more than one of those connections is active for any particular store write operation. Therefore, to place store data into proper byte lanes for memory alignment, (in one implementation) the store queue 400 includes a rotator 402. FIG. 6 illustrates an example in which the store queue 402 (FIG. 4) receives data from a register file that is 8 bytes wide. In the example of FIG. 6, an instruction corresponding to a half-word (2 bytes) store to address 0x02 is received by the store queue 402 on byte lanes 6-7 (as the register file is right-justified). The rotator 402 steers the data in byte lanes 6-7 to byte lanes 2-3 of a given store queue entry.

FIG. 7A illustrates a store queue entry (e.g., entries 0-3) in accordance with one implementation. In one implementation, each store queue entry includes a valid (V) field, an address (ADDR) field, a byte enable (BE) field, a forwardable (FWD) bits field, and a data field. In one implementation, the valid (V) bit field consists of a single bit that indicates whether the corresponding store queue entry is valid. In one implementation, the address (ADDR) field includes the write address (e.g., a store real address) corresponding to the store queue entry. In one implementation, the byte enable (BE) field includes a bit that corresponds to each byte to be written by the store contained in the store queue entry. For example, referring to the store queue 400 shown in FIG. 4, each store queue entry 0-3 would contain a byte enable (BE) field having 8 bits. As with the byte enable (BE) field, the forwardable (FWD) field also includes a bit that corresponds to each byte of the store queue entry. The forwardable (FWD) bit field indicates whether each store contained in the store queue entry can forward a corresponding byte to a load upon the store having a write address that matches a read address of the load. The data field contains data that is actually written to the data cache upon the store leaving the store queue.

FIG. 7B illustrate an example store queue entry. Referring to the half-word store discussed above in connection with FIG. 6, suppose the data corresponding to the half-word store is 0x2233, the write address of the half-word store is 0x02, and the length of the half-word store is 2 bytes. Thus, the store needs to update cache line locations 0x02 and 0x03 and, therefore, byte enable (BE) bits 2 and 3 are set because the bytes corresponding to these bits are the bytes within the data cache line that the store will write. Also, as the store enters the store queue, the store represents the youngest store and the forwardable (FWD) bits 2 and 3 of the store are set. If the bytes to be written by the store overlap any bytes of a pre-exiting store in the store queue, then the overlapping forwardable (FWD) bits of the pre-existing store are reset.

Figure 8:
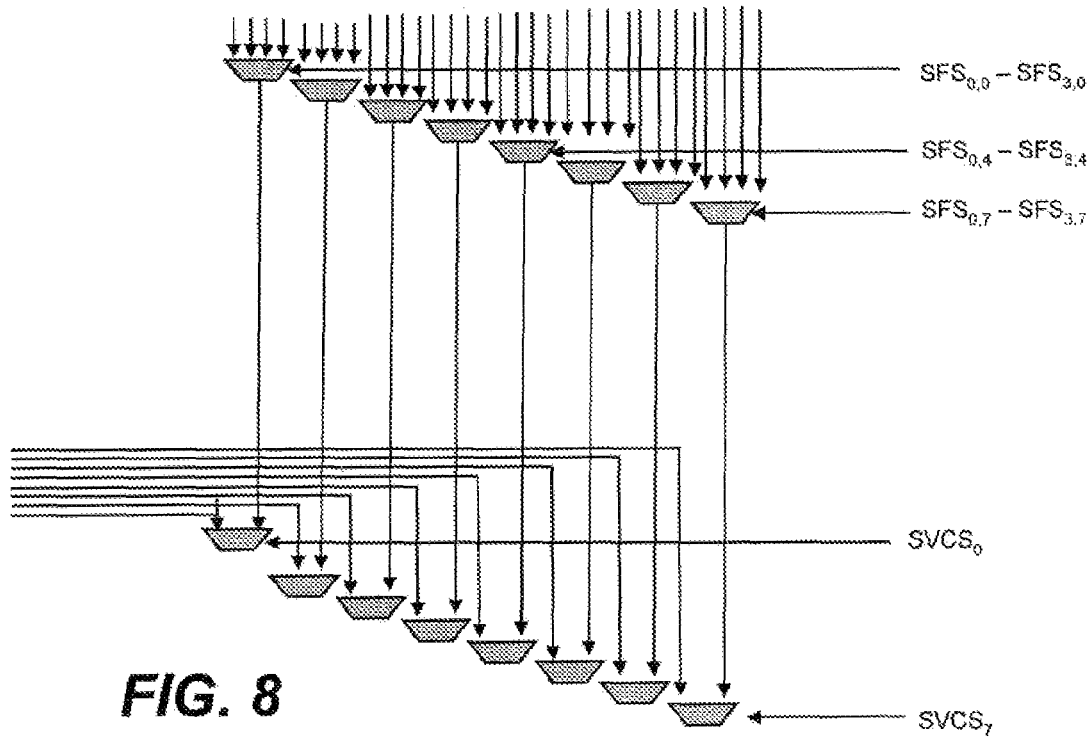
FIG. 8 illustrates interconnections between store forwarding multiplexers and data selection multiplexers of the store queue of FIG. 4 in accordance with one implementation.

Referring back to FIG. 4, in one implementation, the store queue 400 includes store forwarding multiplexers that are each controlled by a unique store forwarding select ($SFS_{i,j}$), where i corresponds to a given store queue entry and j corresponds to a given byte. As discussed above, in one implementation, some of the target bytes for a load can be obtained from the store queue while other target bytes can be obtained from the data cache. Accordingly, in the implementation, shown in FIG. 4, the output of each store forwarding multiplexer is input to a corresponding data selection multiplexer. Each data selection multiplexer is controlled by a unique store vs. cache select ($SVCS_j$). FIG. 8 illustrates the store forwarding multiplexers and the corresponding data selection multiplexers in greater detail. In the example of FIGS. 4 and 8, each store forwarding select ($SFS_{i,j}$) is determined in accordance with the following logic shown in Table 1 below.

TABLE 1

$SFS_{0,0}$ = [(load addr)==(store entry0 addr)] AND (store entry0 Valid) AND ($FWD_{0,0}$==1)
$SFS_{0,1}$ = [(load addr)==(store entry0 addr)] AND (store entry0 Valid) AND ($FWD_{0,1}$==1)
$SFS_{0,2}$ = [(load addr)==(store entry0 addr)] AND (store entry0 Valid) AND ($FWD_{0,2}$==1)
$SFS_{0,3}$ = [(load addr)==(store entry0 addr)] AND (store entry0 Valid) AND ($FWD_{0,3}$==1)
$SFS_{0,4}$ = [(load addr)==(store entry0 addr)] AND (store entry0 Valid) AND ($FWD_{0,4}$==1)
$SFS_{0,5}$ = [(load addr)==(store entry0 addr)] AND (store entry0 Valid) AND ($FWD_{0,5}$==1)
$SFS_{0,6}$ = [(load addr)==(store entry0 addr)] AND (store entry0 Valid) AND ($FWD_{0,6}$==1)
$SFS_{0,7}$ = [(load addr)==(store entry0 addr)] AND (store entry0 Valid) AND ($FWD_{0,7}$==1)
$SFS_{1,0}$ = [(load addr)==(store entry1 addr)] AND (store entry1 Valid) AND ($FWD_{1,0}$==1)
...
$SFS_{3,7}$ = [(load addr)==(store entry3 addr)] AND (store entry3 Valid) AND ($FWD_{3,7}$==1)

Also, in accordance with the example of FIGS. 4 and 8, each store vs. cache select ($SVCS_j$) can be determined in accordance with the logic shown in Table 2 below.

TABLE 2

$SVCS_0$ = ($SFS_{0,0}$) OR ($SFS_{1,0}$) OR ($SFS_{2,0}$) OR ($SFS_{3,0}$)
$SVCS_1$ = ($SFS_{0,1}$) OR ($SFS_{1,1}$) OR ($SFS_{2,1}$) OR ($SFS_{3,1}$)
$SVCS_2$ = ($SFS_{0,2}$) OR ($SFS_{1,2}$) OR ($SFS_{2,2}$) OR ($SFS_{3,2}$)
...
$SVCS_7$ = ($SFS_{0,7}$) OR ($SFS_{1,7}$) OR ($SFS_{2,7}$) OR ($SFS_{3,7}$)

Figure 9:
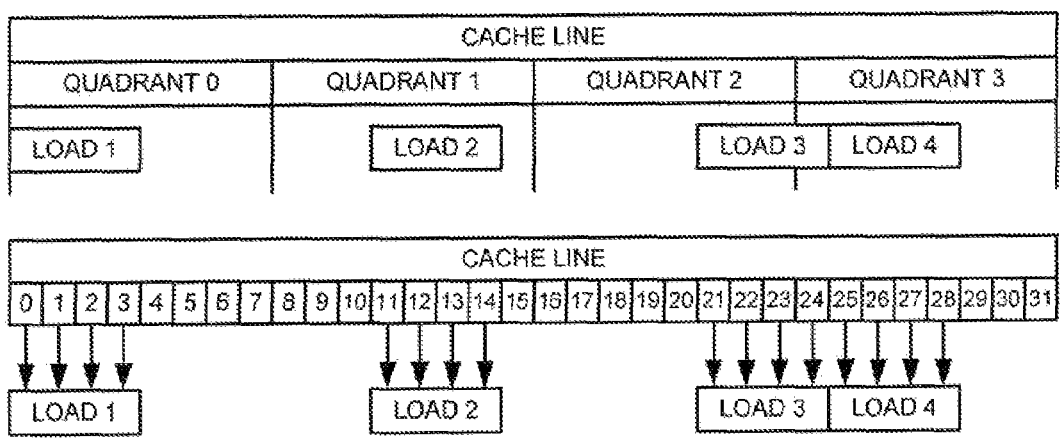
FIG. 9 illustrates alignment boundaries within a data cache line in accordance with one implementation.

Referring to FIG. 9, loads from a data cache (e.g., data cache 110) are usually, but not always operand-aligned. For example, the following loads are operand-aligned: a half-word (2 Bytes) load that begins on a half-word boundary (byte0, byte2, byte4, and so on); a word (4 bytes) load that begins on a word boundary (byte0, byte4, byte8, and so on); a doubleword (DW) (8 bytes) load that begins on a doubleword boundary (byte0, byte8, byte16, and so on). When a data cache is read, the data cache sends a subset of a cache line rather than the entire cache line, and the data is generally sent on an alignment boundary. L1 data cache implementations are typically optimized for aligned load operations. Depending upon the implementation, a load that is not operand-aligned may pay a latency penalty with respect to obtaining each byte of required data from the L1 data cache. In some implementations, a load that is not operand-aligned can still be handled as if the load were operand-aligned as long as the load does not cross an alignment boundary (or quadrant) of the cache line. For example, as shown in FIG. 9, each load 1-4 is 4 bytes in length, and a load is not considered misaligned unless the load crosses an 8 byte boundary (e.g., spans two different quadrants of the cache line). In the example of FIG. 9, load 1 is operand-aligned, load 2 is not operand-aligned, but is handled as if the load were operand-aligned because load 2 does not cross a quadrant boundary, load 3 crosses a quadrant boundary and is, therefore, misaligned and will have to pay a latency penalty, load 4 is not operand-aligned, but is handled as if the load were operand-aligned because load 4 does not cross a quadrant boundary.

Figure 10:
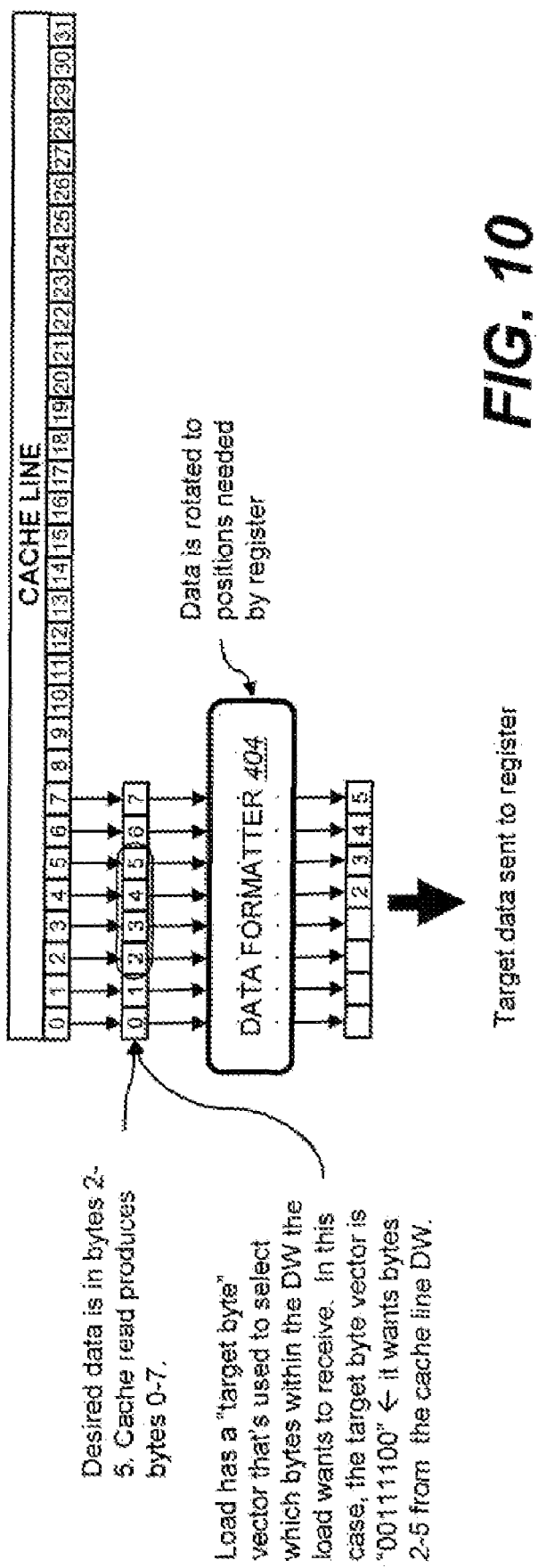
FIG. 10 illustrates a block diagram of a data formatter in the store queue of FIG. 4 in accordance with one implementation.

Referring back to FIG. 4, the output of the data selection multiplexers are provided to a data formatter 404. In one implementation, the data formatter 404 places data into proper byte lanes for register alignment. In one implementation, the data stored in the store queue 400 is memory-aligned and, therefore, data sent from the store queue 400 (or received from a cache line read in the example of FIG. 10) needs to be justified (e.g., right-justified) before the data is sent to a target register within the register file (e.g., register file 112). Accordingly, referring to the example of FIG. 10, a word load beginning at address 0x02 is shown, in which the word load is to be sent to a 64 bit register file. Thus, the target data bytes of the load—byte2, byte3, byte4, byte5—are right-justified by the data formatter 404 prior to the data bytes being sent to the 64 bit register file.

Example

FIGS. 11A-11F illustrate example stores buffered into a store queue and example loads that receive data from the store queue. Note: To assist in these examples, the addresses shown in FIGS. 11A-11F are byte addresses; however, the actual addresses that are saved in the store queue normally only contain enough bits to select the doubleword (DW); the byte addressing/selection is performed through the byte enables (BE).

Referring first to FIG. 11A, an empty store queue is shown having 6 entries that can buffer 6 stores, in which each entry is 8 bytes wide. As shown in FIG. 11B, in a first cycle, a word store of 0xAABBCCDD at real address 0x0002 is buffered in the store queue. The byte enable (BE) bits corresponding to the first store entry is set for each byte to be written by the word store. Thus, byte enable (BE) bits 2, 3, 4, 5 are set, and because the word store is the first entry in the store queue, the forwardable (FWD) bits match the byte enable (BE) bits—i.e., forwardable (FWD) bits 2, 3, 4, 5 are set. In a second cycle, a half-word store of 0x7788 at real address 0x0001 is buffered in the store queue, as illustrated in FIG. 11C. In accordance with the methods discussed above, byte enable (BE) bits 1, 2 are set for the second store entry, and the forwardable (FWD) bits 1, 2 are also set for the second store entry. Because the second byte of the second store entry overlaps the first byte to be written by the first store entry, the forwardable (FWD) bit 2 of the first store entry is reset. As shown in FIG. 11D, in a third cycle, a word store of 0xEEFF1122 at real address 0x0000 is buffered in the store queue. Byte enable (BE) bits 0, 1, 2, 3 are set, and forwardable (FWD) bits 0, 1, 2, 3 are set with respect to the third store entry. In addition, as illustrated, the forwardable (FWD) bits of prior stores that correspond to bytes that overlap bytes being written by the third store are reset.

Referring to FIG. 11E, in a fourth cycle, a half-word load at real address 0x0004 is received by the store queue. An address comparison between the load and the stores in the queue (along with a check of byte enable (BE) bits) results in a hit with the first store entry. Although the first store's write begins at real address 0x0002 and the load's read begins at real address 0x0004, they are considered an address match because the load and the store are to the same doubleword (DW) address, 0x0000; in fact, the load overlaps the last two bytes of the store. Appropriate store vs. cache selects (SVCSs) and store forwarding selects (SFSs) are respectively generated for the store forwarding multiplexers and the data selection multiplexers (FIG. 4) based on the forwardable (FWD) bits and address comparisons, and the target data of 0xCCDD is provided from the store queue to the half-word load. In a fifth cycle, a load word at real address 0x0002 is received by the store queue (FIG. 11F). An address comparison between the load and the stores in the queue (along with a check of byte enable bits) results in a hit with each of the three store queue entries. Similar to above, appropriate store vs. cache selects (SVCSs) and store forwarding selects (SFSs) are respectively generated for the store forwarding multiplexers and the data selection multiplexers (FIG. 4) based on the forwardable (FWD) bits and address comparisons, and the target data of 0x1122CCDD is provided from the store queue to the word load.

One or more of process steps described above can be performed by one or more programmable processors executing a computer program to perform functions by operating on input data and generating output. Generally, the techniques described above can take the form of an entirely hardware implementation, or an implementation containing both hardware and software elements. Software elements include, but are not limited to, firmware, resident software, microcode, etc. Furthermore, some techniques described above may take the form of a computer program product accessible from a computer-usable or computer-readable medium providing program code for use by or in connection with a computer or any instruction execution system.

For the purposes of this description, a computer-usable or computer readable storage medium can be any apparatus that can contain, store, communicate, propagate, or transport the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

Various implementations for forwarding store data to a load have been described. Nevertheless, various modifications may be made to the implementations described above, and those modifications would be within the scope of the present invention. For example, process steps discussed above can be performed in a different order and still achieve desirable results. Also, although the process steps above are discussed in a serial manner, particular process steps can be performed in parallel—for example, the search for all overlapping stores in a store queue can be performed at once (e.g., within a single clock cycle). Also, in general, process steps discussed above can be implemented through hardware logic, or a combination of software and hardware logic. The techniques discussed above can be applied to a variety of different types of processors including, for example, in-order execution processor, out-of-order execution processors, and so on. Accordingly, many modifications may be made without departing from the scope of the present invention.

What is claimed is:

1. A processor comprising:
   a decoder operable to decode an instruction;
   a plurality of execution units operable to respectively execute a decoded instruction from the decoder, the plurality of execution units including,
      a load/store execution unit operable to execute decoded load instructions and decoded store instructions and generate corresponding load memory operations and store memory operations;
   a store queue operable to buffer one or more store memory operations prior to the one or more memory operations being completed, the store queue operable to forward store data of the one or more store memory operations buffered in the store queue to a load memory operation on a byte-by-byte basis;
   a data cache; and
   one or more data selection multiplexers operable to be controlled to provide data stored in the data cache along with store data of one or more store memory operations buffered in the store queue responsive to a load memory operation on a byte-by-byte basis such that at least one byte for the load memory operation is provided from at least one store memory operation buffered in the store queue and at least one other byte for the same load memory operation is provided simultaneously from the data cache.

2. The processor of claim 1, wherein the store data provided to the load memory operation includes a first byte from a first store memory operation buffered in the store queue and includes a second byte from a second store memory operation buffered in the store queue.

3. The processor of claim 1, wherein, for each store memory operation buffered in the store queue, the store queue maintains a forwardable (FWD) bit for each byte to be written by the store memory operation, the forwardable (FWD) bit indicating whether the corresponding byte can be forwarded to a load.

4. The processor of claim 1, wherein the data cache is an L1 (level 1) data cache.

5. The processor of claim 1, wherein the store queue is memory aligned and includes a rotator operable to place store data of a store memory operation into pre-determined byte lanes in the store queue.

6. The processor of claim 5, wherein the processor further includes a data formatter operable to place data output from the one or more data selection multiplexers into pre-determined byte lanes for register alignment.

7. The processor of claim 1, wherein, for each store memory operation buffered in the store queue, the store queue maintains a byte enable (BE) bit for each byte to be written by the store memory operation, the byte enable (BE) bit indicating whether the corresponding byte is to be written to the data cache.

8. The processor of claim 1, wherein the processor is an in-order execution processor.

9. The processor of claim 1, wherein the processor is an out-of-order processor.

10. A method of operation for a store queue in a processor, the method comprising:
   receiving a first store memory operation at the store queue;
   setting a forwardable (FWD) bit of each byte to be written by the first store memory operation, the forwardable (FWD) bit indicating whether the corresponding byte can be forwarded to a load; and
   resetting a forwardable (FWD) bit corresponding to each byte in a second store memory operation buffered in the store queue responsive to the byte in the second store overlapping a byte to be written by the first store memory operation.

11. The method of claim 10, further comprising forwarding store data of the first store memory operation or store data of the second store memory operation to a load memory operation on a byte-by-byte basis.

12. The method of claim 11, further comprising using each set forwardable (FWD) bit in the store queue as a multiplexer select for selecting each byte of the store data forwarded from the store queue.

13. The method of claim 11, wherein forwarding store data of the first store memory operation or store data of the second store memory operation to a load memory operation includes forwarding a first byte from the first store memory operation and forwarding a second byte from the second store memory operation to the load memory operation.

14. The method of claim 11, wherein forwarding store data of the first store memory operation or store data of the second store memory operation to a load memory operation includes:
   comparing an address associated with the load memory operation to an address associated with each of the first store memory operation and the second store memory operation; and
   forwarding each byte of the first store memory operation or the second store memory operation having a set forwardable (FWD) bit responsive to the address associated with the load memory operation matching the address associated with each of the first store memory operation or the second store memory operation.

15. The method of claim 10, further comprising setting a byte enable (BE) bit of each byte to be written by the first store memory operation, the byte enable (BE) indicating whether the corresponding byte is to be written to a data cache.

16. The method of claim 15, wherein the data cache is an L1 (level 1) data cache.

17. The method of claim 10, wherein the processor is an in-order execution processor.

18. The method of claim 10, wherein the processor is an out-of-order execution processor.

19. A computer program product, tangibly stored on a computer readable storage medium, for operating for a store queue, the computer program product comprising instructions to cause a programmable processor to:
   receive a first store memory operation at the store queue;
   set a forwardable (FWD) bit of each byte to be written by the first store memory operation, the forwardable (FWD) bit indicating whether the corresponding byte can be forwarded to a load; and
   reset a forwardable (FWD) bit corresponding to each byte in a second store memory operation buffered in the store queue responsive to the byte in the second store overlapping a byte to be written by the first store memory operation.

* * * * *